(12) United States Patent
Hung et al.

(10) Patent No.: US 9,223,066 B2
(45) Date of Patent: Dec. 29, 2015

(54) PATTERNED RETARDER

(71) Applicant: Far Eastern New Century Corporation, Taipei (TW)

(72) Inventors: Wei-Che Hung, Zhongli (TW); Da-Ren Chiou, Zhongli (TW); Yu-June Wu, Zhongli (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 0 days.

(21) Appl. No.: 14/472,501

(22) Filed: Aug. 29, 2014

(65) Prior Publication Data

US 2015/0323719 A1 Nov. 12, 2015

(30) Foreign Application Priority Data

May 7, 2014 (TW) .............................. 103116265 A (51) Int. Cl.
*G02F 1/1335* (2006.01)
*G02B 5/30* (2006.01)

(52) U.S. Cl.
CPC .................................... *G02B 5/3016* (2013.01)

(58) Field of Classification Search
CPC ........ G02F 2001/133631; G02F 2001/133633; G02B 5/3016
USPC .................................................... 349/117–119
See application file for complete search history.

(56) References Cited

U.S. PATENT DOCUMENTS 8,817,209 B2 * 8/2014 Kuo ........................ B32B 38/06
156/60

* cited by examiner

*Primary Examiner* — Joseph L Williams
(74) *Attorney, Agent, or Firm* — McClure, Qualey & Rodack, LLP (57) ABSTRACT

A patterned retarder is provided. A microstructure layer is disposed on a substrate of the optical retarder. The microstructure layer has a plurality of trapezoid protrusions. A bottom angel of the trapezoid protrusions is 12-85 degree. A conformal alignment layer and a liquid crystal phase retarder layer are sequentially disposed on the microstructure layer.

12 Claims, 7 Drawing Sheets

PATTERNED RETARDER

CROSS-REFERENCE TO RELATED APPLICATION

This application claims the priority benefit of Taiwanese application serial no. 103116265 filed May 7, 2014, the full disclosure of which is incorporated herein by reference.

BACKGROUND

1. Technical Field

The disclosure relates to an optical film. More particularly, the disclosure relates to a patterned retarder.

2. Description of Related Art

Patterned retarder (or micro retarder) is an optical film having different microstructures respectively located on odd-row areas and even-row areas of the optical film. The phase difference of the odd- and even-row areas is usually $\lambda/2$. For example, the phase of the odd- and even-row areas may be 0 and $\lambda/2$, respectively, or $\lambda/4$ and $-\lambda/4$, respectively. Therefore, when the patterned retarder is attached to the outer surface of a display, the patterned retarder can transform the polarization state of pixels located on the odd and even rows to display 3D images.

The patterned retarders are firstly prepared by molding process. A phase retarder is formed first, and then the phase retarder on the odd-row areas or the even-row areas is removed by a knife to make the phase difference of the odd-row areas and the even-row areas to be $\lambda/2$.

Liquid crystal ISO phase preparing method, which is a method for preparing film with optically birefringent and isotropic regions, includes coating a liquid crystal layer on an entire substrate first. Next, the odd-row areas or the even-row areas are irradiated by light to make the phase angle of the odd-row areas or the even-row areas to be $\lambda/2$. Next, the rest of the liquid crystal layer is heated to be in an ISO phase and then cured by heat to make the retardation to be zero.

As for the dual-regions alignment method, which is a method for fabricating a patterned retarder having two different states of alignment, the method uses rubbing or optical ways to make the alignments of the odd-row areas and the even-row areas to be different. Thus, the phase difference of the odd-row areas and the even-row areas is $\lambda/2$.

The methods described above, the liquid crystal molecules located on the interfacial areas between the odd-row areas and the even-row areas usually have a derangement problem. The derangement problem can cause light leakage to form bright lines on the images of the display, and the quality of the displayed 3D images is thus decreased.

SUMMARY

In one aspect, the present invention is directed to a patterned retarder for solving the light leakage problem in the interfacial areas and thus causes bright lines in the display to increase the quality of the 3D display.

A patterned retarder is provided. The patterned retarder includes a substrate, a microstructure layer, an alignment layer, and a liquid crystal phase retarder layer. The microstructure layer is disposed on the substrate, wherein the microstructure layer has a plurality of trapezoid protrusions, and a bottom angle of the trapezoid protrusions is 12-85 degree. The alignment layer is conformably disposed on the microstructure layer. The liquid crystal phase retarder layer is disposed on the alignment layer.

According to some embodiments, the bottom angle of the trapezoid protrusions is 12-65 degree.

According to some other embodiments, a height of the trapezoid protrusions is 0.5-2.0 µm.

According to some other embodiments, a width of a top surface of the trapezoid protrusions is 100-1000 µm.

According to some other embodiments, a width of a bottom surface of the trapezoid protrusions is 100-1000 µm.

According to some other embodiments, a material of the microstructure layer is UV curable resin or thermosetting resin.

In some embodiments, the UV curable resin is an acrylic resin or a silicone. In other embodiments, a material of the thermosetting resin is a thermosetting polyurethane.

According to some other embodiments, a material of the substrate is polyethylene terephthalate, polycarbonate, tri-acetyl cellulose, polymethyl methacrylate, or cyclo-olefin polymer.

According to some other embodiments, a material of the alignment layer includes a photo-induced crosslinking resin, a photo-induced isomerization resin, or a photo-induced decomposition resin, and the photo-induced crosslinking resin has a photopolymerizable functional group, such as cinnamate, coumarin, chalcone, maleimide, quinolinone, bis (benzylidene), and a combination thereof.

According to some other embodiments, a thickness of the alignment layer is 50-100 nm.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

BRIEF DESCRIPTION OF THE DRAWINGS

FIGS. 3B-9 are photographs of examples and comparing examples obtained by a polarizing microscope.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Structure of Patterned Retarder

Figure 1A:
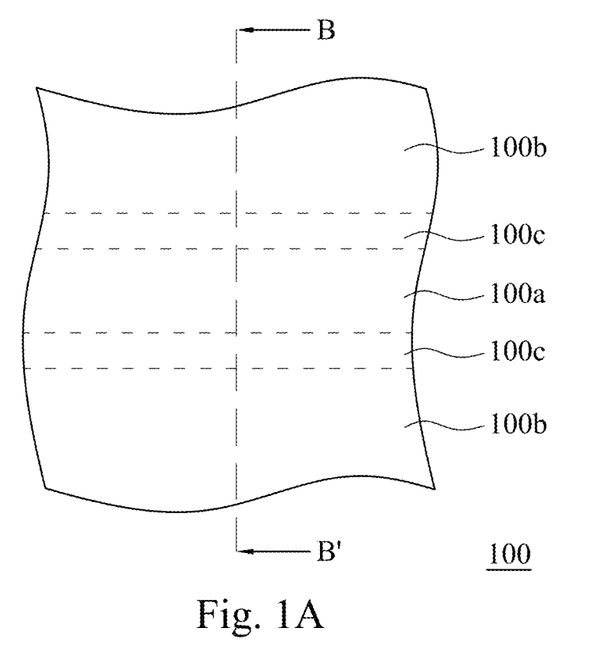
FIG. 1A is a schematic top view of a patterned retarder according to an embodiment of this disclosure.
Figure 1B:
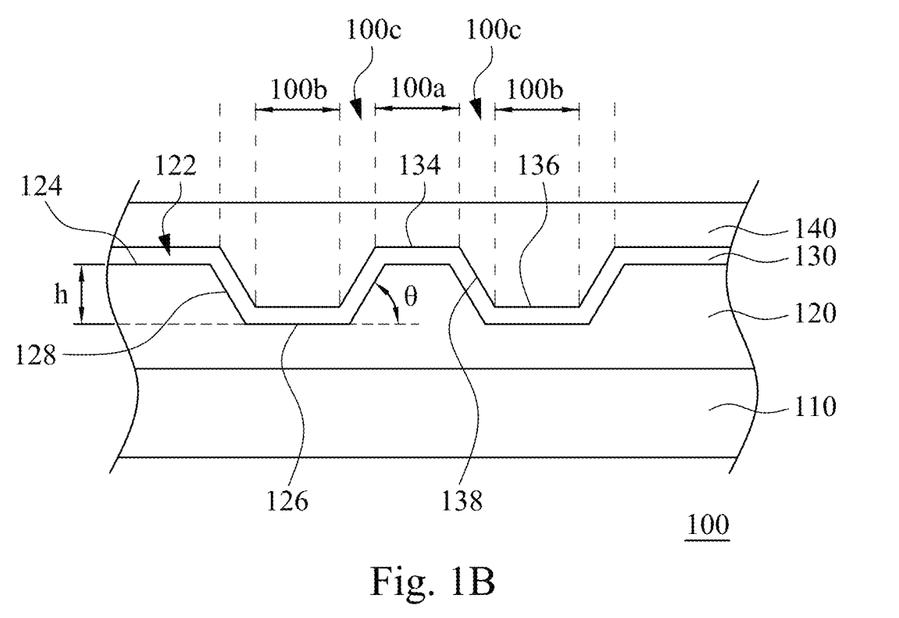
FIG. 1B is a cross-sectional diagram of the cutting line B-B' in FIG. 1A.

FIG. 1A is a schematic top view of a patterned retarder according to an embodiment of this disclosure. FIG. 1B is a cross-sectional diagram of the cutting line B-B' in FIG. 1A. FIGS. 1A and 1B are referred below at the same time.

In FIG. 1A, a patterned retarder 100 has first phase areas 100a, second phase areas 100b, and interfacial areas 100c. The phase difference between the first phase areas 100a and the second phase areas 100b is λ/2. In the cross-sectional diagram of FIG. 1B, the patterned retarder 100 has a substrate 110, a microstructure layer 120, a conformal alignment layer 130, and a liquid crystal retarder layer 140.

The substrate 110 may be made from a material of polyethylene terephthalate (PET), polycarbonate (PC), triacetyl cellulose (TAC), polymethyl methacrylate (PMMA), or cyclo-olefin polymer (COP). The phase difference of the substrate 110 may be as small as possible to avoid affecting the display quality of the 3D images. For example, the phase difference of the substrate 110 may be smaller than 20 nm, such as 0 nm. The thickness of the substrate 110 is about 25-200 μm.

In FIG. 1B, the microstructure layer 120 has a plurality of trapezoid protrusions 122. The top surface 124, the bottom surface 126 and inclined surface 128 of the trapezoid protrusions 122 are respectively corresponding to the first phase area 100a, the second phase area 100b, and the interfacial area 100c in FIG. 1A. The height h of the trapezoid protrusions 122 is mainly determined by the birefringence of the liquid crystal in the liquid crystal phase retarder layer 140. When the birefringence difference (Δn) of the liquid crystal in the liquid crystal phase retarder layer 140 is greater, the shorter the height h is needed for the phase difference of the first phase areas 100a and the second phase areas 100b to be λ/2. Generally, the height h of the trapezoid protrusions 122 is about 0.5-2.0 μm, such as 2 μm. The width of the top surface 124 and the bottom surface 126 of the trapezoid protrusions 122 is about 100-1000 μm, such as 500 μm. The angle θ between the inclined surface 128 and the extension line of the bottom surface 126, i.e. the bottom angle θ of the trapezoid protrusions 122, is 12-85 degree, such as 12-65 degree.

The microstructure layer 120 is made from a curable resin after being cured, and the curable resin includes a UV curable resin and a thermosetting resin. For example, the UV curable resin includes acrylic resin and silicone, and the thermosetting resin includes thermosetting polyurethane. The acrylic resin includes methacrylate resin, the silicone includes polydimethyl siloxane, and the thermosetting polyurethane includes thermosetting polyurethane.

In FIG. 1B, the alignment layer 130 is conformal with the microstructure layer 120, and the alignment layer thus also has top surface 134, bottom surface 136, and inclined surface 138, which are respectively corresponding to the first phase area 100a, the second phase area 100b, and the interfacial area 100c in FIG. 1A. The thickness of the alignment layer 130 is about 50-100 nm.

The material of the alignment layer 130 is a photo-cured alignment resin. The alignment resin is a photosensitive material. Linearly polarized light can be used to irradiate the alignment resin at a selected direction to induce anisotropically photoreaction in the alignment resin to induce the alignment of the liquid crystal molecules on the alignment layer 130. The alignment resin is a photo-induced cross-linking resin having a functional group being capable of performing photo-polymerization. The functional group above may be cinnamate, coumarin, chalcone, maleimide, quinolinone, bis (benzylidene), or a combination thereof. The irradiation dosage needed for the functional groups above is lower, lowest with only 5 mJ/cm² can achieve the alignment effect.

The liquid crystal phase retarder layer 140 has a planar top surface, but since the bottom surface of the liquid crystal phase retarder layer 140 is not planar, the liquid crystal phase retarder layer 140 has various thicknesses. Therefore, the electromagnetic vibration direction of the polarized light penetrating the liquid crystal phase retarder layer 140 will be rotated to various angles in turn. That is, the phase of the polarized light penetrating the liquid crystal phase retarder layer 140 will be different to let the display apparatus display 3D images.

The liquid crystal phase retarder layer 140 is made from a polymerizable liquid crystal material, including photo curable or thermosetting liquid crystal materials. Since the thickness difference of the liquid crystal phase retarder layer 140 on the first phase area 100a and the second phase area 100b is the same as the height h of the trapezoid protrusions 122, and the phase difference between the first phase area 100a and the second phase area 100b is λ/2, the birefringence difference Δn of the liquid crystal material and the thickness difference h of the liquid crystal phase retarder layer 140 on the first phase area 100a and the second phase area 100b have to meet the relationship of $\lambda/2 = \Delta n \times h$.

For example, when the wavelength of the incident light is 560 nm and the birefringence difference is 0.14, the thickness of the liquid crystal phase retarder layer 140 on the first phase areas 100a is 1 μm, and the thickness of the liquid crystal phase retarder layer 140 on the second phase areas 100b is 3 μm. As another example, when the wavelength of the incident light is 560 nm and the birefringence difference is 0.56, the thickness of the liquid crystal phase retarder layer 140 on the first phase areas 100a is 0.5 μm, and the thickness of the liquid crystal phase retarder layer 140 on the second phase areas 100b is 1.5 μm.

Preparation Method of Patterned Retarder

Figure 2:
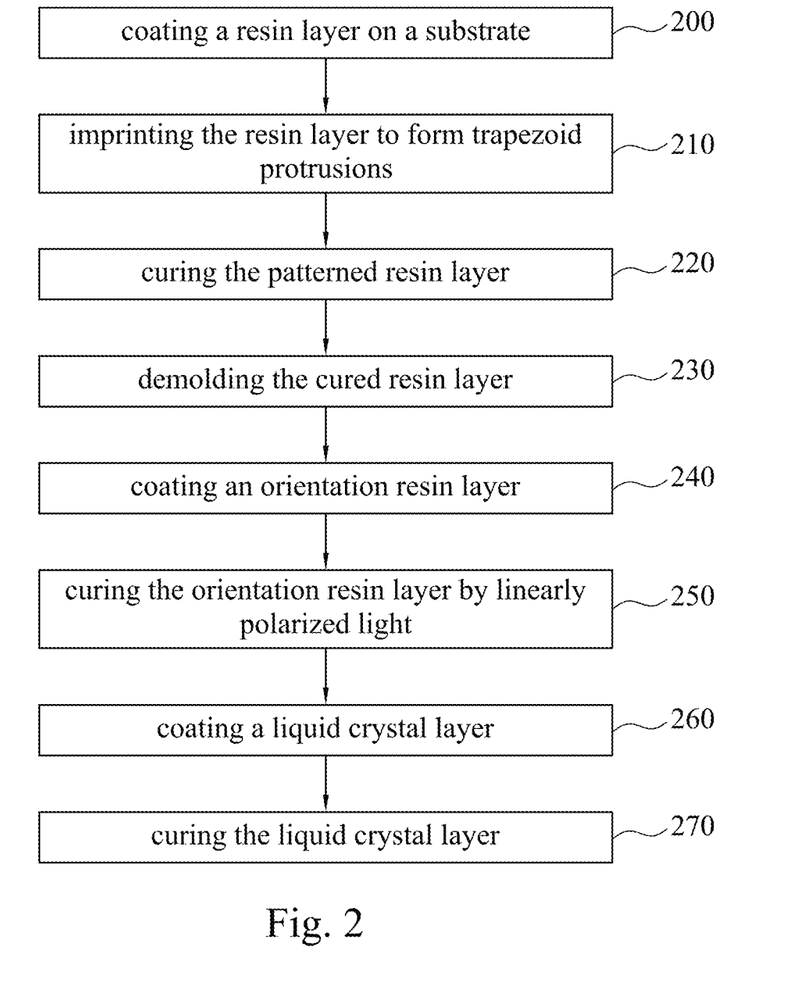
FIG. 2 is a flow chart of the preparation method of a patterned retarder according to some embodiments of this disclosure.
Figure 3A:
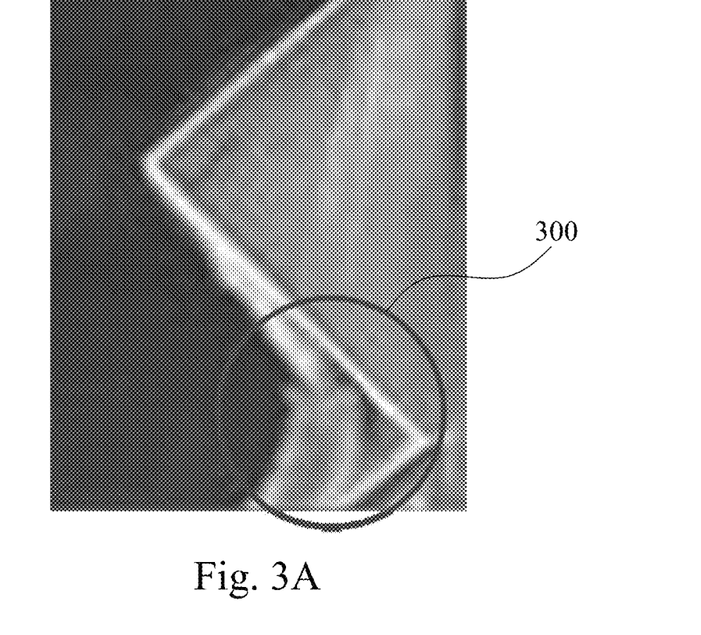
FIG. 3A is a photograph shown, after demolding step, adhesive residue was occurred at the interface between the bottom surface and the inclined surface of the trapezoid protrusions.
Figure 3B:
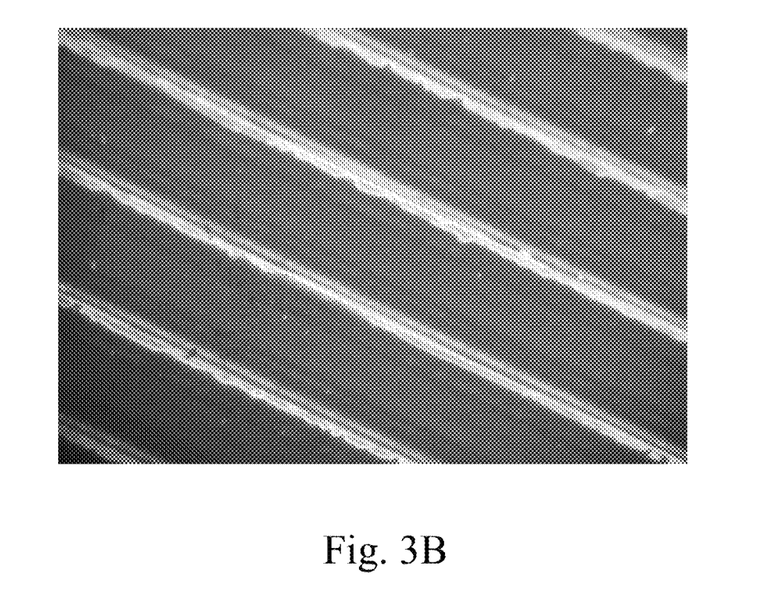
Figure 4:
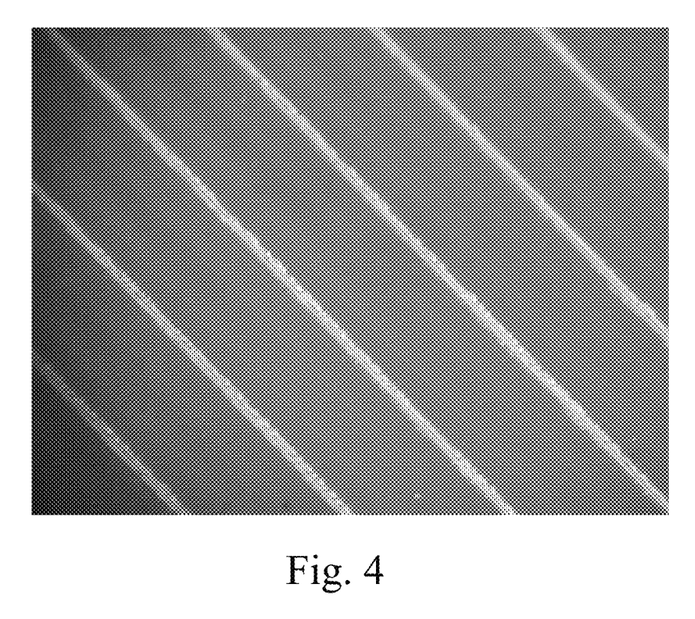
Figure 5A:
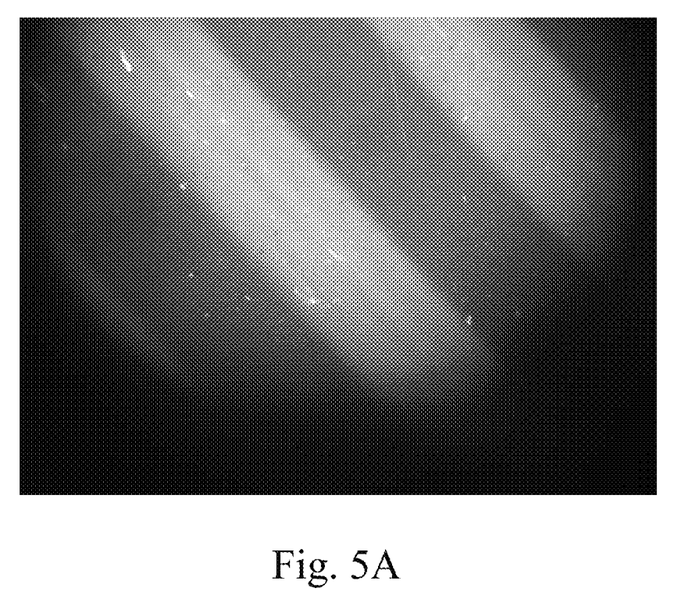
Figure 5B:
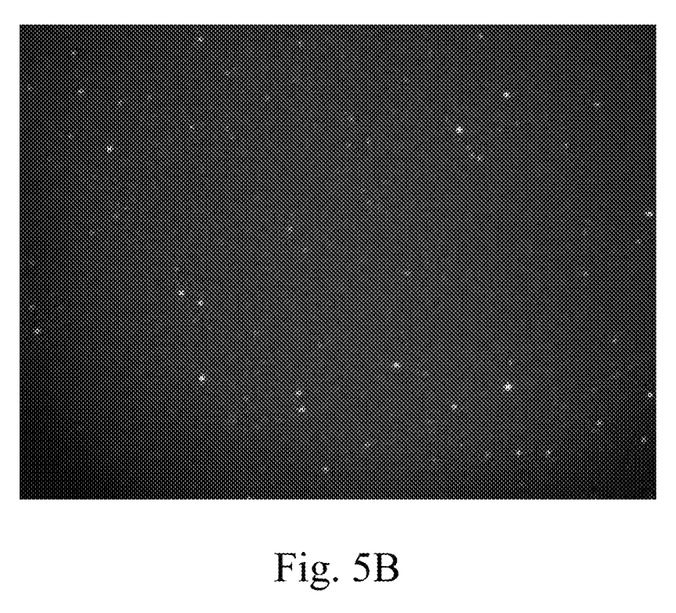
Figure 6:
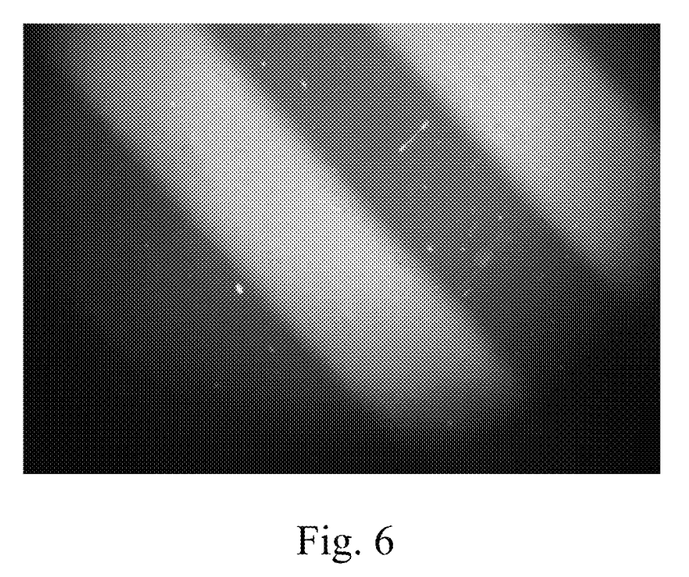
Figure 7:
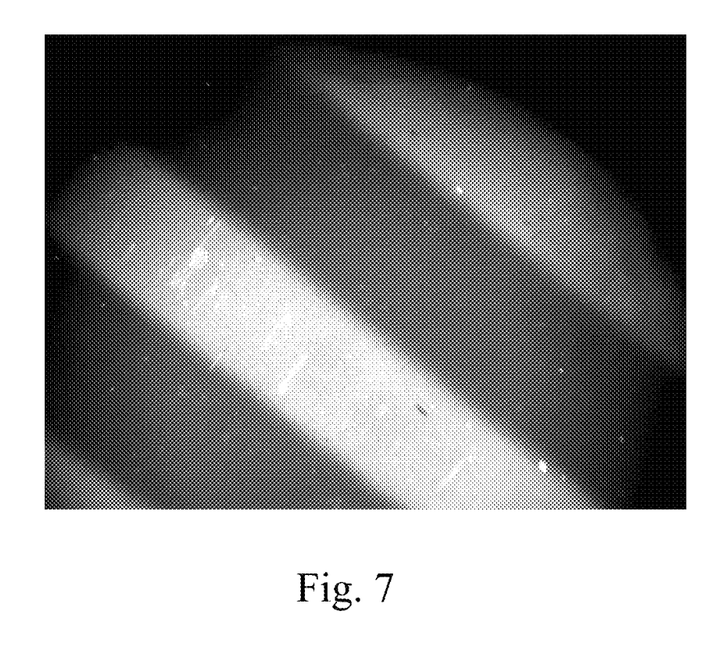
Figure 8:
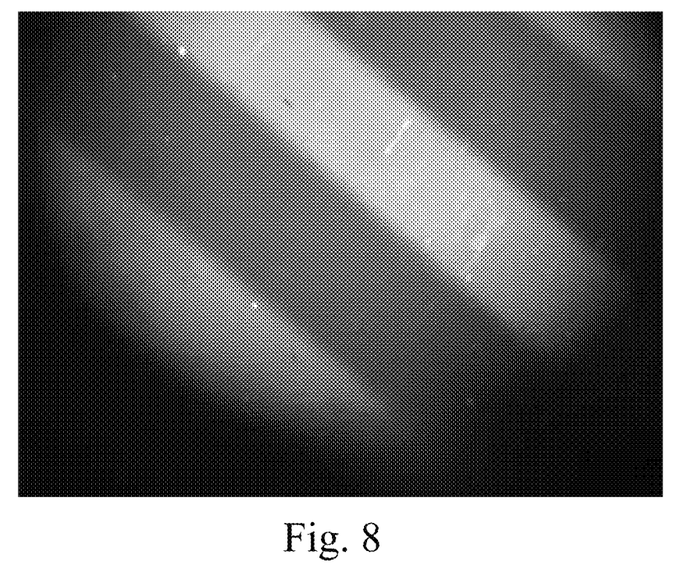
Figure 9:
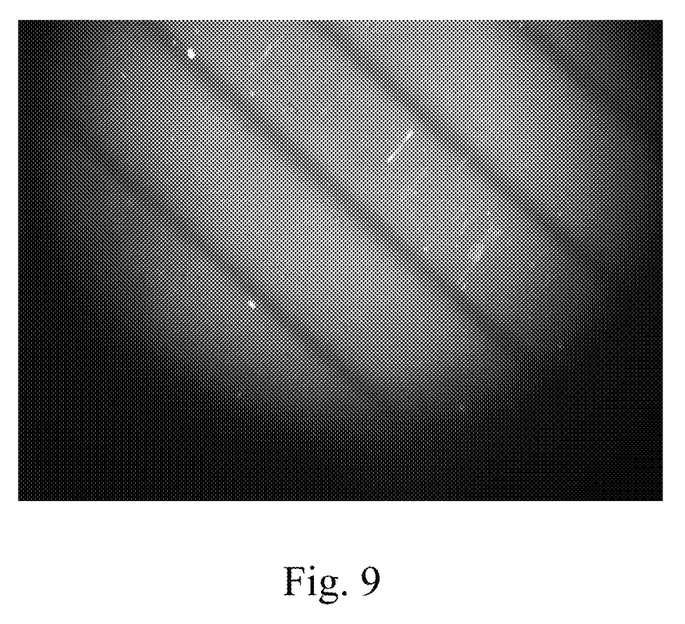

A flow chart of the preparation method of the above patterned retarder according to some embodiments of this disclosure is shown in FIG. 2. In the detailed description below, FIG. 2 and FIGS. 1A-1B are referred at the same time.

First, in step 200, a layer of curable resin is coating on the substrate 110. The coating method may be any useable methods, such as die coating or gravure coating. Next, a mold roller or a mold stamp having a three-dimensional pattern is used to imprint the curable resin layer to form trapezoid protrusions 122 on the curable resin layer. In step 220, according to the material of the curable resin, light or heat is used to cure the curable resin. In step 230, the cured resin is demolded to form the microstructure layer 120. The materials of the substrate 110 and the microstructure layer 120 have been described above, and thus omitted here.

In step 240, an alignment resin layer is conformally coated on the microstructure layer 120, and the coating method may be any usable methods, such as spin coating. In step 250, linearly polarized light is used to cure the alignment resin layer to form the alignment layer 130. The angle between the polarization direction of the linearly polarized light and the alignment of the various phase areas, i.e. the first phase areas 100a, the second phase areas 100b, and the interfacial areas 100c, is not zero or not 180 degree. That is, the polarization direction of the linearly polarized light does not parallel to the alignment of the various phase areas. In addition, since the microstructure layer 120 uses the inclined surface 128, rather than a vertical surface, to connect the top surface 124 and the bottom surface 126, the alignment resin can be more easily coated on the inclined surface 128, and the alignment resin on the inclined surface 128 can be more easily cured by the linearly polarized light.

In step 260, a liquid crystal layer is coated on the alignment layer 130, and the coating method may any useable methods, such as spin coating. In step 270, light or heat is used to cure the liquid crystal layer to form the liquid crystal phase retarder layer 140 to complete the preparation of the patterned retarder 100. Similarly, since the alignment layer 130 uses the inclined surface 138, rather than a vertical surface, to connect the top surface 134 and the bottom surface 136, the liquid crystal layer on the inclined surface 138 can be more easily cured by exposing to light.

EXAMPLES

The preparation methods of some examples and comparing examples are described below. The only difference is the various bottom angles θ of the trapezoid protrusions 122 in FIG. 1B.

First, a layer of UV-curable acrylic resin was coated on a triacetyl cellulose substrate. After imprinted by a mold, the acrylic resin layer was irradiated by UV light to cure the acrylic resin layer. Next, the cured acrylic resin layer was demolded to form a microstructure layer.

Next, methylethylketone and cyclopentanone were mixed by a weight ratio of 1:1 to form a mixed solvent. Then, an alignment resin (model ROP103, cinnamic acid ester series, 10% solid content, Rolic, Switzerland) was added into the mixed solvent to form an alignment resin solution having a solid content of 1.25 wt %. The alignment resin solution was spin coated (3000 rpm, 40 seconds) to conformally cover the microstructure layer. The solvent was removed by heating at a temperature of 100° C. for 2 minutes. Finally, linearly polarized UV light (the alignment angle was 45°, and the irradiation dosage was 180 mJ/cm$^2$) was used to irradiate the dried alignment resin layer to cure the dried alignment resin layer to obtain an alignment layer.

Next, powder of liquid crystal was dissolved in cyclopentanone to prepare a liquid crystal solution having a solid content of 20 wt %. The liquid crystal solution was spin coated on the alignment layer, and then dried at a temperature of 60° C. for 5 minutes to remove the solvent. Finally, the liquid crystal layer was irradiated by UV light (irradiation dosage was 120 mJ/cm$^2$) under nitrogen atmosphere to cure the liquid crystal layer to obtain a liquid crystal phase retarder layer. Accordingly, a patterned retarder was obtained.

The test results of the 3D displayed images of the examples and the comparing examples are listed in the Table 1 below and shown in FIGS. 3A-9. In the photographs of FIGS. 3B, 4, 5B, and 9, the polarization direction of the light source of the polarizing microscope was parallel to or perpendicular to the alignment angle of the sample. Therefore, in general, the observed displayed image is all black if no light leakage problems. However, if a light leakage problem does exist, bright lines will be generated on the interfacial areas between the first phase areas and the second phase areas. In addition, since the defects of the comparing example 2 cannot be observed by using the same observation conditions above, the intensity of the light source of the polarizing microscope was increased to obtain the image of the FIG. 9 to highlight the problem of light leakage.

In FIGS. 5A, 6, 7, and 8, the angle between the polarization angle of the light source of the polarizing microscope and the alignment angle of the patterned retarder was other than 180° or 90°. In addition, for highlighting the phase difference of the patterned retarder under the polarizing microscope, a quarter-wave plate was added on the patterned retarder. Therefore, images of alternative arranged bright areas and dark areas could be observed.

TABLE 1

Effect of bottom angle of trapezoid protrusions on the 3D display images

| | Bottom angle of trapezoid protrusions | De-molding defects | Light leakage in pixels | Bright lines on the interfacial areas | FIGS. |
|---|---|---|---|---|---|
| Comparing example 1 | 87.1° | Yes | Yes | Yes | 3B |
| Example 1 | 84.3° | some | No | Yes | 4 |
| Example 2 | 63.4° | No | No | No | 5A-5B |
| Example 3 | 26.6° | No | No | No | 6 |
| Example 4 | 18.4° | No | No | No | 7 |
| Example 5 | 12.5° | No | No | No | 8 |
| Comparing example 2 | 11.3° | No | Yes | No | 9 |

From the results shown in Table 1 and FIGS. 3A-9, it can be known that adhesive residue problem (please see the adhesive residue 300 in FIG. 3A) was more easily occurred at the interface between the bottom surface and the inclined surface of the trapezoid protrusions when the bottom angles of the trapezoid protrusions were too large, such as 87.1° of the comparing example 1. Hence, the alignment of the liquid crystal molecules located on the adhesive residue is irregular to create bright lines on the interface (please see FIG. 3B), and a light leakage problem of pixels was thus occurred.

When the bottom angle of the trapezoid protrusions was slightly decreased, such as 84.3° of the Example 1, the adhesive residue can be decreased, and the light leakage problem of pixels can be solved at the same time.

The bottom angles of the trapezoid protrusions in Examples 2-5 were 12.5°-63.4°. No adhesive residue was left, hence no bright lines were observed on the interfaces, and no light leakage problem was occurred. Please see FIGS. 5A-8.

No adhesive residue problem occurred when the bottom angle of the trapezoid protrusions was further decreased, such as 11.3° of the comparing example 2. However, since the non-uniform phase angle, light leakage problem occurred again, and the display quality was decreased.

Accordingly, the bottom angle of the trapezoid protrusions should be controlled in a specific range. A normal 3D display quality may be obtained when the bottom angle of the trapezoid protrusions are about 12°-85°.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A patterned retarder, comprising:
   a substrate;
   a microstructure layer disposed on the substrate, wherein the microstructure layer has a plurality of trapezoid protrusions, and a bottom angle of the trapezoid protrusions is 12-85 degree;
   an alignment layer conformally disposed on the microstructure layer; and
   a liquid crystal phase retarder layer disposed on the alignment layer.

2. The patterned retarder of claim 1, wherein the bottom angle of the trapezoid protrusions is 12-65 degree.

3. The patterned retarder of claim 1, wherein a height of the trapezoid protrusions is 0.5-2.0 μm.

4. The patterned retarder of claim 1, wherein a width of a top surface of the trapezoid protrusions is 100-1000 μm.

5. The patterned retarder of claim 1, wherein a width of a bottom surface of the trapezoid protrusions is 100-1000 μm.

6. The patterned retarder of claim 1, wherein a material of the microstructure layer is UV curable resin or thermosetting resin.

7. The patterned retarder of claim 6, wherein the UV curable is an acrylic resin or a silicone.

8. The patterned retarder of claim 6, wherein a material of the thermosetting resin is a thermosetting polyurethane.

9. The patterned retarder of claim 1, wherein a material of the substrate is polyethylene terephthalate, polycarbonate, triacetyl cellulose, polymethyl methacrylate, or cyclo-olefin polymer.

10. The patterned retarder of claim 1, wherein a material of the alignment layer comprises photo-induced crosslinking resin.

11. The patterned retarder of claim 10, wherein the photo-induced crosslinking resin has a photopolymerizable functional group, and the photopolymerizable functional group is selected from the group consisting of cinnamate, coumarin, chalcone, maleimide, quinolinone, and bis(benzylidene).

12. The patterned retarder of claim 1, wherein a thickness of the alignment layer is 50-100 nm.

* * * * *